Nov. 16, 1965   J. R. MULLEN   3,217,948
LIQUID DISPENSER FOR ACCURATELY DISPENSING
EQUAL MEASURED AMOUNTS OF LIQUID
Filed Feb. 28, 1962
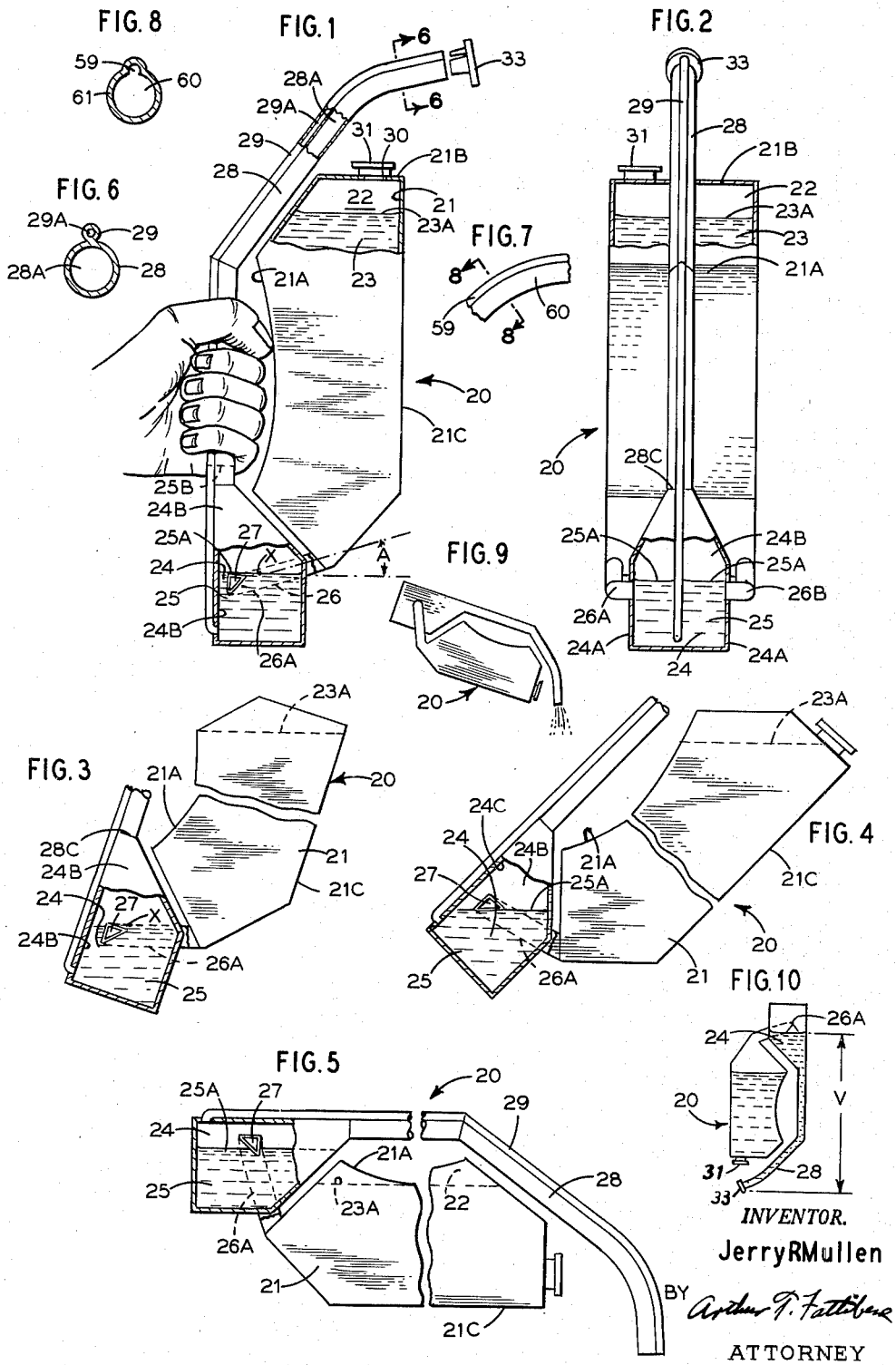
INVENTOR.
JerryRMullen
ATTORNEY

United States Patent Office 3,217,948
Patented Nov. 16, 1965

3,217,948
LIQUID DISPENSER FOR ACCURATELY DISPENSING EQUAL MEASURED AMOUNTS OF LIQUID
Jerry R. Mullen, 186 Read Ave., Crestwood, N.Y.
Filed Feb. 28, 1962, Ser. No. 176,350
11 Claims. (Cl. 222—424)

This invention relates in general to a liquid dispenser, and more specifically to a liquid dispenser for dispensing uniform measured amounts of the liquid each time the dispenser is tilted for pouring.

Heretofore, many efforts have been made to construct a liquid dispenser for pouring uniform predeterminable or measured amounts of the liquid, e.g. liquid detergents, liquors, medicines and other liquids which are generally used in measurable amounts, each time the dispenser or bottle is tilted, as evidenced by U.S. Patents Nos. 957,005; 1,508,410; 2,212,367. However, dispensers typified by the prior known constructions proved to be unsatisfactory. This was because the amount of the measured quantity of the liquid dispensed was likely to vary on each pouring and thus rendered the dispenser inherently unreliable. Further, some of the known constructions alleged to dispense equal measurable amounts on each pouring operation would, if held or tilted in a certain manner, cause the liquid to flow continuously, and thereby dispense substantially more than the desired measured amount. For these reasons the prior construction proved to be impractical for their intended purpose.

Therefore, an object of this invention is to provide an improved liquid dispenser that is constructed and arranged to dispense substantially the same or equal amounts of the liquid each time the dispenser is tilted for pouring.

Another object is to provide a liquid dispenser constructed so as to render it impossible to pour more than the prescribed measured amount.

Another object is to provide a dispenser that is relatively simple in construction and positive in operation.

Still another object is to provide a liquid dispenser having a measuring chamber and connected pouring spout constructed and arranged with respect to the main liquid chamber of the dispenser so as to render it impossible for the liquid to flow until the dispenser is tilted or rotated through more than 90°.

Still another object is to provide an improved means for venting the measuring chamber of the dispenser.

Still another object is to provide a liquid dispenser which is constructed and arranged so that the measured amount of the liquid can be readily re-established in the event more than the measured amount of liquid should accidentally find its way into the measuring chamber, as in excessive shaking of the dispenser as during transit and the like.

A feature of this invention resides in the provision that the dispenser is constructed and arranged so that it can be readily mass produced as by blow molding or the like.

Another feature resides in the provision that the construction of the liquid dispenser is such that any liquid in excess of the measured amount of liquid which may accumulate in the measuring chamber of the dispenser, as by shaking or jarring, will be automatically returned to the main chamber of the dispenser prior to pouring, so that only the predetermined amount of liquid will be dispensed.

Still another feature of this invention resides in the provision of a novel pouring spout disposed relative to the liquid chamber of the dispenser in a manner whereby it may be used as a handle, and thus assures that the dispenser is properly held at all times to dispense the measured liquid portion.

Other features and advantages will be rendered more apparent when considered in view of the description and drawings in which:

FIG. 1 illustrates a vertical side view of the liquid dispenser of this invention in its normal upright position and having portions thereof shown in section.

FIG. 2 is a rear elevation view of the dispenser of FIG. 1 with portions shown in section.

FIG. 3 illustrates a fragmentary side elevation view of the dispenser tilted slightly toward pouring position.

FIG. 4 illustrates a fragmentary side view of the dispenser tilted further toward pouring position.

FIG. 5 is a side elevation view of the dispenser rotated through 90°.

FIG. 6 is a section view taken along line 6—6 of FIG. 1.

FIG. 7 is a fragmentary side view of a modified construction.

FIG. 8 is a sectional view taken along line 8—8 of the modified construction of FIG. 7.

FIG. 9 illustrates the dispenser in pouring position.

FIG. 10 illustrates the dispenser in position to re-establish the amount of liquid in the measuring chamber.

Referring to the drawing, the liquid dispenser 20 embodying the instant invention is graphically illustrated. It will be understood that the particular graphic illustration of the liquid dispenser 20, as shown, will suffice for explaining the inventive concept embodied therein, and that in practice or commercial application, the shape, form or style of the particular dispenser may be varied or modified without departing from the spirit or scope of this invention.

The liquid dispenser 20, as shown, is particularly adapted for dispensing liquids, e.g. liquid detergents, wines, liquors, medicines and the like, in equal predetermined or measurable amounts each time the dispenser is tilted for pouring. According to this invention the dispenser 20 comprises inclosing walls 21 to define a closed main liquid chamber 22 for containing a supply of the liquid 23 that is to be dispensed. Below and to one side of the main chamber 22 there is a separate and distinct measuring chamber 24 which is shaped and proportioned to contain the desired measured amount of the liquid 25 to be dispensed at any one pouring, e.g. a two fluid ounce measure or the like. As shown, a conduit 26 interconnects the bottom of the main chamber 22 with the measuring chamber 24.

In the illustrated embodiment two conduits 26A, 26B are shown, each conduit being arranged so that they connect into the opposed side walls 24A of the measuring chamber 24. In accordance with this invention, each conduit 26A, 26B enters the measuring chamber 24 at an angle A with respect to the horizontal when in the upright position. In the illustrated embodiment angle A is shown as being approximately 15°. The arrangement of the maesuring chamber 24 is such that the opening 27 of the conduits 26 are disposed immediately below the normal surface or level 25A of the measured quantity of the liquid 25 contained in chamber 24.

In the illustrated embodiment the conduit opening 27 to the measuring chamber is shown as a substantially right triangle in which one leg of the right angle is disposed parallel to the level 25A of the liquid 25 and the other leg disposed perpendicular to the level 25A of the liquid. While a triangular opening is preferred, it will be understood that the opening 27 may assume other shapes including that of a circle.

A pouring spout 28 is connected in communcation with the measuring chamber 24. As shown, the pouring spout 28 is connected in communication with the upper portion 24B of measuring chamber 24 adjacent the far side 24C thereof. The spout 28 extends upwardly from the measuring chamber portion 24B and along the upright rear wall 21A of the main chamber 22. According to the invention an intermediate portion of the spout is spaced from the adjacent wall portion 21A of the main chamber 22 to provide a clearance by which the spout 28 may be grasped and thus function as a handle, as shown in FIG. 1. The arrangement is such that the handle, thus provided, insures that the dispenser 20 is properly held each time the dispenser 20 is tilted to pour the prescribed measured amount.

As shown the spout 28 extends along the rear wall 21A to a point beyond the upper end or top 21B of the main chamber 22, and it continues across the top 21B thereof so that the discharge end 28A thereof extends slightly beyond the front side 21C of the main chamber 22, as best seen in FIG. 1.

In accordance with this invention means are provided to vent the measuring chamber. By venting the measuring chamber, a smooth uniform flow of liquid may be had, and thereby eliminate the gurgling and/or splattering effect otherwise accompanying the pouring of the liquid. In the embodiment of FIGS. 1 to 6, the venting means comprises a small diameter tube 29 disposed contiguous with the spout 28 along the outer wall thereof. As shown in FIGS. 1 to 6, the vent 29 and spout 28 define substantially co-extensive separate and distinct passageways 29A, 28A communicating with the measuring chamber 24. Preferably the vent tube 29 extends beyond the spout opening 28C to the top of measuring chamber 24.

If desired the top of the main chamber is provided with a filler opening 30 which is sealed by a suitable cap 31.

The operation of the dispenser described is as follows:

With the dispenser 20 normally containing a liquid supply 23 as shown in FIGS. 1 and 2, a portion of the liquid 23 will flow from the main chamber 22 to the measuring chamber 24 through conduits 26A, 26B until the level 25A of the liquid 25 in the measuring chamber 24 reaches the top of the conduits 26A, 26B. At this point equilibrium is reached and the flow of the liquid to the measuring chamber 24 will cease. The construction of the chamber 24 is such that when equilibrium is reached, the prescribed measured quantity of the liquid 25 normally is in the measuring chamber 24. Normally this measured quantity will be maintained. However, in the event of severe shaking or jarring of the dispenser 20, as in shipment, it is possible that some air may find its way up through conduits 26A, 26B to the main chamber. If this occurs, the air will displace more of the liquid 23 from the main chamber 22 to the measuring chamber 24. Thus it may be possible that more than the measured quantity of liquid, under the above mentioned extreme conditions, may come to be disposed in the metering or measuring chamber 24. However, in accordance with this invention, in tilting the dispenser 20 for pouring the liquid from the measuring chamber 24, the arrangement and construction is such that the excess liquid in chamber 24, if any, will flow back to the main chamber 22 prior to the actual pouring, so that only the prescribed measured amount will be ultimately dispensed.

It will be apparent that when the dispenser is tilted as seen in FIG. 3, the liquid level 25A normally or otherwise disposed above the top of the conduits openings 27 will shift around a point X so as to maintain the opening of the conduits submerged, and thus prevent any air from entering the conduits 26A, 26B and finding its way to the main chamber 22. Consequently, no liquid will flow from the main chamber 22 to the measuring chamber 24 during tilting.

When the dispenser 20 has been rotated more than 15° as shown in FIG. 4, the conduits 26A, 26B point downwardly. Consequently, air can no longer enter the conduits 26A, 26B. Therefore no liquid 23 from the main chamber 22 can be displaced to vary the amount of liquid 25 in the measuring chamber 24. It is now to be noted that continued tilting of the dispenser 20 tends to reverse the height of the respective liquid levels 23A, 25A in the respective chambers 22 and 24. Where in the normal upright position the level 23A of the liquid 23 in the main chamber 22 is normally higher, in the tilted position the level 25A of the liquid 25 in the measuring chamber 24 assumes the higher position. See FIG. 5. Thus any liquid, in excess to predetermined measured amount in chamber 24, and standing about the top of the conduit opening 27, will flow through the conduits 26A, 26B and back into the main chamber 22 of the dispenser 20, so that the liquid 25 in the measuring chamber will level off at a point near the bottom of the inside dimension of the conduits. As the dispenser 20 assumes the position of FIG. 5, all the excess liquid, if any, within the measuring chamber would have returned to the main chamber 22. Thus only the prescribed measured amount of liquid 25 remains in the measuring chamber 24. Then and only then will further tilting of the dispenser 20 cause the measured liquid in the measuring chamber 24 to pour from the spout 28 as seen in FIG. 9; the vent 29 assuring that splattering and gurgling is minimized during pouring. When the liquid 25 in chamber 24 has been drained, pouring is ceased, as no more liquid is available for pouring, and it being impossible for any of the liquid 22 in the main chamber 24 to flow.

After the measured amount of liquid has been drained from chamber 24, the dispenser is righted. When this occurs the liquid 23 in the main chamber 22 will again fill the measuring chamber 24 thereby readying it for the next dispensing position.

FIGS. 8 and 9 illustrate a modified form of the invention. The invention of FIGS. 8 and 9 is similar in all respects to that herein described with the exception of the vent construction. In this form of the invention, the vent 59 is disposed in open communication with the liquid passageway 60 of the spout 61. Accordingly, the vent 59 extends substantially co-extensively with the length of spout 61 and it is disposed along the outer side of spout 61. Thus in pouring position the vent 59 is disposed above the passageway 60 of spout 61. The bottom end of the vent 59 opens to the measuring chamber.

It is to be noted that the width of the opening rendering the vent 59 in communication with the passageway 60 of the spout 61 will vary in accordance with the characteristics of the liquid, i.e. the opening is dependent upon the viscosity of the liquid to be dispensed. Thus the greater the viscosity of the liquid, the greater should be the width of the opening between vent 59 and passageway 60. Generally, the opening or spacing by which the vent 59 communicates with the passageway 60 of spout 61 should be such that as the liquid is being dispensed the surface tension of the liquid will form a wall between the vent 59 and passageway 60 of the spout.

The theory of operation of the modified vent construction 59 is that any air in the passageway 60 of the spout 61 during a pouring operation will tend to rise. In doing so the air bubbles will break through the surface tension of the liquid flowing through the spout and separating the vent passage from the liquid passage. Thus the air is vented through the air passageway 59 positioned above the surface tension of the liquid flowing through the lower spout passageway 60.

An important feature of this invention resides in the fact that the dispenser 20 is constructed so as to permit gross re-establishment of the measured quantity of liquid 25 in the event more than the measured amount of liquid finds its way into chamber 24. For example, when the dispenser 20 has been filled and capped, numerous conditions may cause the liquid level 25A in chamber 24 to vary. For example, temperature changes may affect the air pressures and vacuum within the dispenser. Also hard handling and vibration as in shipping may cause air to be displaced within the dispenser, and thus upset the liquid levels 23A and 25A. Dropping or accidental overturning of the dispenser 20 may also upset the liquid levels.

Therefore, a gross corrective feature is built into the dispenser 20.

According to this invention, in the event the liquid attains an abnormal level, as for example as indicated at 25B, see FIG. 1, the corrective action can be accomplished simply by turning the dispenser 20 upside-down, as indicated in FIG. 10, with the caps 33 and 31 secured in place.

In accordance with this invention the dispenser 20 is constructed so that the volume V, as seen in FIG. 10, of the upper part 24B of the chamber 24 and the spout 29 is less than the volume of measured quantity of liquid 25, i.e. the liquid standing to level 25A of FIG. 1. Thus any excess of liquid, in chamber 24, with the dispenser positioned as in FIG. 10, will flow through conduits 26A, 26B back to the main chamber 22. Thus, the remaining liquid standing in the spout 28 and the upper portion 24B of chamber 24 of FIG. 10 will be less than the measured quantity, and it will not fill the chamber 24 when the dispenser is again righted, as in FIG. 1. Consequently when the dispenser 20 is righted again, the additional liquid necessary to make the measured quantity will flow from the main chamber 22 to the measuring chamber 24 until level 25A is reached. As a result the required measure has been corrected, and it will be dispensed upon the next tilting of the dispenser 20. Therefore, to insure that the measured amount be accurate, the consumer need only to turn the dispenser upside-down to re-establish the measured quantity prior to dispensing. However, it will be appreciated that such gross corrective action need only be performed, if necessary, on the first use of the dispenser. For the subsequent uses, the measured quantity is not likely to be upset, as the dispenser is not normally subjected to hard handling within a home as the extreme conditions necessary to cause the upset of liquid level are not present. Consequently, under normal conditions, subsequent measured amounts can be accurately dispensed without the necessity for effecting the gross corrective actions, as the normal corrective action occurring during ordinary tilting, as hereinbefore described, will be sufficient to insure that only the measured amount is dispensed.

From the foregoing description it will be noted that the described dispenser is relatively simple in construction and positive in operation. With the described construction substantially equal amounts of the measured quantities can be repeatedly dispensed. This is because the construction and arrangement is such that any excess accumulated in the measuring chamber 24 can find its way back into the main chamber prior to pouring. Also by controlling the relative differences in levels with the respective chamber in the tilted position of the dispenser, the accuracy of consistency can be increased or decreased accordingly.

Also it is to be noted that accidental dropping of the dispenser will not cause any spillage of the liquid from the dispenser even if the end of the spout 28 is opened. As seen in FIG. 5, the liquid can not be spilled with the dispenser horizontally disposed. This is because the level 25A of the liquid 25 is below the opening to the spout 28. Also, laying the dispenser over on its spout will not cause the liquid to pour, if the spout is constructed to extend beyond the side 21C of the dispenser as shown in FIG. 1.

Filling of the dispenser 20 may be readily attained in the conventional manner through the filling opening 30, or through the spout 28. If the dispenser 20 is to be filled through the filler opening 30, an air tight cap 33 should be placed in the end 28A of the spout 28. Upon filling, the liquid will fill the measuring chamber 24 up to the point where air can escape therefrom, and then it will begin to slightly compress the air in chamber 24 and 22, but not go higher. When the air tight cap 31 is replaced in the filler opening and the cap 33 of the spout 28 removed, a small amount of liquid will move into the measuring chamber to create a slight vacuum in the main chamber 22.

It will be understood that the dispenser, as herein described, may be formed of any suitable material. However, the dispenser of the particular invention can be readily fabricated from a suitable plastic material by blow molding or the like.

While the instant invention has been disclosed with reference to particular embodiments thereof, it is to be appreciated that the invention is not to be taken as limited to all of the details thereof as modifications and variations thereof may be made without departing from the spirit or scope of the invention.

What is claimed is:

1. A liquid dispenser tiltable between a normal upright position and a tilted dispensing position for accurately dispensing equal predetermined volumes of liquid upon each tilting dispensing operation there of comprising,
    (a) a main liquid chamber,
    (b) a measuring chamber,
    (c) a conduit connecting said main chamber in communication with said measuring chamber and through which a volume of liquid flows from the main chamber to the measuring chamber in the normal upright position of said dispenser, said conduit being disposed at an acute angle with respect to the liquid level in the measuring chamber in the upright position of the dispenser so that in a tilted pouring position the end of the conduit in communication with the measuring chamber becomes disposed above the liquid level therein and the other end of the conduit opening to the main chamber is disposed below the level of liquid therein,
    (d) said measuring chamber having a volume greater than the volume of the liquid normally contained therein so that the volume of the liquid in said measuring chamber defines a discernable liquid level therein,
    (e) said conduit being positioned so that in the normal upright position of the dispenser the flow of said liquid flowing from said main chamber to said measuring chamber is terminated as said discharge end of the conduit becomes submerged in the liquid volume flowing into said measuring chamber,
    (f) means for venting said measuring chamber during the dispensing operation,
    (g) and a pouring spout means communicating with said measuring chamber for dispensing the liquid in said measuring chamber upon tilting of the dispenser whereby the tilting of said dispenser effects rotation of the liquid level about the discharge end of the conduit to permit any excess of liquid in said measuring chamber to be returned through said conduit to said main chamber prior to the dispensing of the established predetermined measured amount of liquid from said measuring chamber to insure that only the predetermined quantity of measured liquid in said measuring chamber is dispensed upon each tilting of the dispenser.

2. The invention as defined in claim 1 wherein said vent means and pouring spout defined separate and distinct passageways to said measuring chamber.

3. A liquid dispenser tiltable between a normal upright position and a tilted dispensing position for accurately dispensing equal predetermined volumes of liquid upon each tilting dispensing operation thereof comprising,
    (a) a main liquid chamber,
    (b) a measuring chamber,
    (c) a conduit connecting said main chamber in communication with said measuring chamber and through which a volume of liquid flows from the main chamber to the measuring chamber in the normal upright position of the dispenser,
    (d) said measuring chamber having a volume greater than the volume of the liquid normally contained therein so that the volume of the liquid in said measuring chamber defines a discernable liquid level therein, (e) said conduit being positioned so that in the normal upright position of the dispenser the flow of said liquid flowing from said main chamber to said measuring chamber is determined as said discharge end of the conduit becomes submerged in the liquid volume flowing into said measuring chamber, (f) means for venting said measuring chamber during the dispensing operation, (g) and a pouring spout communicating with said measuring chamber for dispensing the liquid in said measuring chamber upon tilting up the dispenser whereby the tilting of said dispenser effects rotation of the liquid level about the discharge end of the conduit to permit any excess of liquid in said measuring chamber to be returned through said conduit to said main chamber prior to the dispensing of the established predetermined measured amount of liquid in the measuring chamber, wherein the combined volumes of both the measuring chamber above the normal liquid level therein and spout are less than the volume of the liquid standing at the normal liquid level therein so that re-establishment of the normal liquid level may be had when necessary simply by inverting the sealed dispenser and thereby permitting any excess liquid in the measuring chamber to be returned to the main chamber by way of said conduits.

4. A liquid dispenser for accurately dispensing substantially equally measured amounts of the liquid each time the dispenser is tilted to dispense the same, said dispenser comprising a main liquid chamber, a measuring chamber disposed below said main chamber, a conduit connecting the bottom of said main chamber to said measuring chamber, said conduit having its outlet disposed to determine the flow of liquid from said main chamber to said measuring chamber as said outlet is submerged immediately below the level of the measured quantity of liquid in said measuring chamber when in the non-tilted position of said dispenser, a pouring spout means in communication with said measuring chamber, said spout means extending along the outer side of the main chamber whereby said spout is extended over the level of the liquid in the main chamber in the tilted pouring position of said dispenser to dispense all of the predetermined measured quantity of liquid in said measuring chamber.

5. The invention as defined in claim 4 wherein a portion of said spout means is spaced from the wall of the main chamber and thereby defines a handle whereby the portion of said spout means may be grasped for insuring that the dispenser is properly held when pouring.

6. A liquid dispenser for dispensing substantially equal measured amounts of the liquid contained therein each time the dispenser is tilted comprising a main liquid chamber and a metering chamber disposed below said main chamber, a conduit connecting the bottom of said main chamber to said metering chamber, said conduit being disposed at an angle with respect to the normal liquid level in said metering chamber in the upright non-tilted position of said dispenser so that said conduit has its discharge end in communication with said metering chamber to determine the flow of liquid into said metering chamber as said discharge end becomes submerged below the liquid level in said metering chamber and has its other end in communication with the main chamber disposed above the normal liquid level of said metering chamber in the upright position of said dispenser, a pouring spout connected in communication with said metering chamber, said spout having its inlet end disposed above the normal level of the liquid in said metering chamber in the upright position of the dispenser, said conduit being angled so that upon tilting up the dispenser to pouring position the end of the conduit in communication with said metering chamber becomes disposed above the normal liquid level therein and the opening of the conduit to the main chamber becomes disposed below the normal liquid level in said measuring chamber, and said chambers being relatively positioned with respect to one another so that in the pouring position the normal level of the measured liquid in the metering chamber is above the level of the liquid in the main chamber so that the relative position of said chambers and angle of said conduit there between enables any excess liquid in said metering chamber to be returned to said main chamber prior to pouring of the measured amount of liquid in said metering chamber and, thereby insuring that only the predetermined quantity of liquid is dispensed upon each tilting of the dispenser, and wherein the end of said conduit communicating with said metering chamber is triangular in cross-section.

7. A liquid dispenser for dispensing substantially equal measured amounts of the liquid contained therein each time the dispenser is tilted for pouring comprising a main liquid chamber and a measuring chamber disposed below said main chamber, a conduit connecting the bottom of said main chamber to said measuring chamber, said conduit being disposed at an angle with respect to the normal liquid level in said measuring chamber in the upright non-tilted position of said dispenser so that said conduit has its discharge end in communication with said measuring chamber, said discharge end being positioned to determine the flow of liquid to said measuring chamber as said discharge end becomes submerged below the normal level of the liquid in said measuring chamber and has its other end which communicates with the main chamber positioned at an elevation above the normal liquid level in said measuring chamber in the upright position of said dispenser, a pouring spout connected in communication with said measuring chamber, said spout having its inlet end disposed above the normal level of the liquid in said measuring chamber, said conduit being angled so that upon tilting of the dispenser to pouring position the end of the conduit in communication with said measuring chamber becomes disposed above the normal liquid level therein and the other end opening of the conduit to the main chamber becomes disposed below the normal liquid level in said measuring chamber whereby flow of liquid from the main chamber to the measuring chamber is prevented, said chambers being relatively positioned with respect to one another so that in the pouring position the normal level of the measured liquid in the measuring chamber is above the level of the liquid in the main chamber and thereby enabling any excess liquid in said measuring chamber to be returned to said main chamber prior to pouring of the same to insure that only the predetermined quantity of liquid is dispensed upon each tilting of the dispenser, and means for venting said measuring chamber during pouring.

8. A liquid dispenser for accurately dispensing substantially equal measured amounts of the liquid contained therein each time the dispenser is tilted for pouring comprising a main liquid chamber and a measuring chamber disposed below said main chamber, a conduit connecting the bottom of said main chamber to said measuring chamber, said conduit being disposed at a positive angle with respect to the normal liquid level in said measuring chamber in the upright non-tilted position of said dispenser so that said conduit has its end in communication with said measuring chamber disposed below the normal liquid level in said measuring chamber to determine the flow of liquid thereinto and has its other end in communication with the main chamber disposed at an elevation above the normal liquid level of said measuring chamber in the upright position of said dispenser, a pouring spout connected in communication with said measuring chamber, said spout having its inlet end disposed above the normal level of the liquid in said measuring chamber in the upright position of the dispenser, said spout and upper portion of the measuring chamber having a volume which is less than than the volume of the measuring chamber below the normal liquid level therein, and said conduit being angled so that upon tilting of the dispenser to pouring position the end of the conduit communicating with said measuring chamber is disposed above the normal liquid level therein and the opening of the conduit to the main chamber is disposed at an elevation below the normal liquid level in said measuring chamber to prevent any flow of liquid from the main chamber to the measuring chamber, said chambers being relatively positioned with respect to one another so that in the pouring position the normal level of the liquid in the measuring chamber is above the level of the liquid in the main chamber thereby enabling any excess liquid in said measuring chamber to be returned to said main chamber prior to pouring of the same for insuring that only the predetermined quantity liquid is disposed upon each tilting of the dispenser, and means for venting said measuring chamber.

9. The invention as defined in claim 8 wherein said venting means includes a passageway having its interior in open contiguous communication with the interior of said spout.

10. A liquid dispenser tiltable between a normal upright position and a tilted dispensing position for accurately dispensing equal predetermined volumes of liquid upon each tilting dispensing operation thereof comprising,
   (a) a main liquid chamber,
   (b) a measuring chamber,
   (c) a conduit disposed at an angle connecting said main chamber in communication with said measuring chamber so that in a normal upright position of the dispenser a volume of liquid flows from the main chamber to the measuring chamber, said conduit being disposed at an acute angle with respect to the liquid level in the measuring chamber in the upright position of the dispenser so that in a tilted pouring position the end of the conduit in communication with said measuring chamber becomes disposed above the liquid level in said measuring chamber and the other end of the conduit opening to said main chamber is disposed below the level of the liquid in said main chamber,
   (d) said conduit being positioned so that its discharge end determines the flow of said liquid flowing from said main chamber to said measuring chamber as said discharge end becomes submerged in the liquid volume flowing into said measuring chamber,
   (e) and in the tilted dispensing position said conduit is directed to return any excess liquid in said measuring chamber back to said main chamber,
   (f) said measuring chamber having a volume greater than the volume of the liquid normally contained therein when in the upright positions of said dispenser so that the volume of the liquid in said measuring chamber defines a discernable liquid level therein,
   (g) means for venting said measuring chamber during the dispensing operation,
   (h) and a pouring spout means communicating with said measuring chamber for dispensing the liquid in said measuring chamber upon tilting of the dispenser whereby the tilting of said dispenser effects rotation of the liquid level about the discharge conduit end to permit any excess of liquid in said measuring chamber to be returned through said conduit to said main chamber prior to the dispensing of the established pre-determined measured amount of liquid thereby from said measuring chamber,
   (i) and in said dispensing position the discharge end is disposed above the level of the liquid in said main chamber thereby rendering it impossible for any liquid from the main chamber to flow to the measuring chamber to vary the established measured amount so that only the predetermined measured amount of liquid in said measuring chamber can be dispensed.

11. A liquid dispenser tiltable between a normal upright position and a tilted dispensing position for accurately dispensing equal predetermined volumes of liquid upon each tilting dispensing operation thereof comprising,
   (a) a main liquid chamber,
   (b) a measuring chamber,
   (c) a conduit connecting said main chamber in communication with said measuring chamber and through which a volume of liquid flows from the main chamber to the measuring chamber in the normal upright position of the dispenser,
   (d) said measuring chamber having a volume greater than the volume of the liquid normally contained therein so that the volume of the liquid in said measuring chamber defines a discernable liquid level therein,
   (e) said conduit being positioned so that in the normal upright position of the dispenser the flow of said liquid flowing from said main chamber to said measuring chamber is determined as said discharge end of the conduit becomes submerged in the liquid volume flowing into said measuring chamber,
   (f) means for venting said measuring chamber during the dispensing operation,
   (g) and a pouring spout communicating with said measuring chamber for dispensing the liquid in said measuring chamber upon tilting up the dispenser whereby the tilting of said dispenser effects rotation of the liquid level about the discharge end of the conduit to permit any excess of liquid in said measuring chamber to be returned through said conduit to said main chamber prior to the dispensing of the established predetermined measured amount of liquid in the measuring chamber,
   (h) and said venting means continuously contacts said spout throughout its length and is in continuously opened communication with said spout throughout its length.

References Cited by the Examiner

UNITED STATES PATENTS

| 1,009,550 | 11/1911 | Moys | 222—456 X |
| 1,508,410 | 9/1924 | Ranck | 222—456 |
| 1,791,452 | 2/1931 | Ljungman | 222—454 X |
| 2,122,906 | 7/1938 | Baum | 222—456 |
| 2,279,728 | 4/1942 | Ballard | 222—424 X |
| 2,828,054 | 3/1958 | Chiaramonte | 222—479 |

FOREIGN PATENTS 628,091 8/1949 Great Britain.

LOUIS J. DEMBO, *Primary Examiner.*